United States Patent [19]

Patashnick

[11] 3,926,271

[45] Dec. 16, 1975

[54] MICROBALANCE

[75] Inventor: Harvey Patashnick, Albany, N.Y.

[73] Assignee: Georg Rupprecht, Englewood, Calif.; a part interest

[22] Filed: Feb. 3, 1975

[21] Appl. No.: 546,273

[52] U.S. Cl. ............ 177/210; 177/DIG. 6; 73/67.2
[51] Int. Cl.² ........................................ G01G 3/14
[58] Field of Search.................. 177/1, 210, DIG. 6; 73/67.2

[56] References Cited
UNITED STATES PATENTS

| | | | |
|---|---|---|---|
| 3,492,858 | 2/1970 | Heflinger et al. | 177/210 X |
| 3,555,886 | 1/1971 | Thornton | 177/210 X |
| 3,565,193 | 2/1971 | Wirth | 177/210 X |

Primary Examiner—George H. Miller, Jr.
Attorney, Agent, or Firm—Schiller & Pandiscio

[57] ABSTRACT

A microbalance comprising a tapered tubular element that is clamped at one end while the other end is free to vibrate. The specimen whose mass is to be evaluated is attached to the free end of the tapered tubular element. The tapered tubular element is set into oscillation and a feedback system maintains the oscillation. The mass is determined by measuring the resonant frequency of the tapered tubular element which will change in accordance with the mass loading of the tapered tubular element.

21 Claims, 6 Drawing Figures

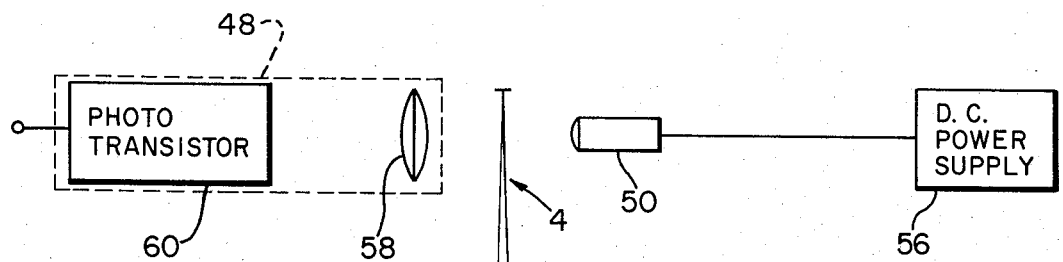
FIG. 2
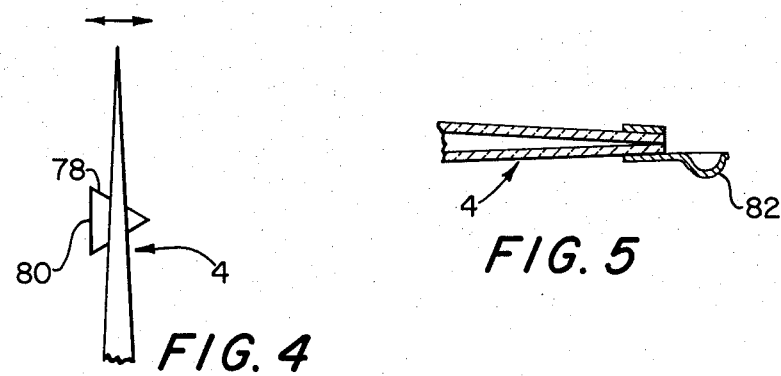
FIG. 4
FIG. 5
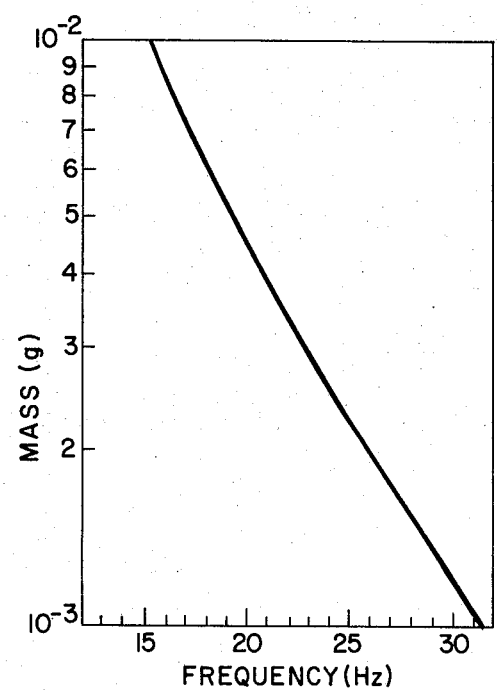
FIG. 6

MICROBALANCE

This invention pertains to micro-weight determination and more particularly to provision of a novel micro-balance.

Heretofore two unique devices of high sensitivity have been developed for mass measurement which do not depend upon gravity for their operation. The first of these employs a quartz crystal resonator and is known as a QCM or quartz crystal microbalance. It is used for the measurement of thin uniform film deposits. The other device is the oscillating fiber microbalance which is used for the mass determination of individual microparticles. Thus, these two devices serve completely different purposes. It is part of the novelty of this invention that both types of measurements can be performed by the new microbalance.

QCM's are described in the text by Wolsky and Zdanuk, "Ultra Micro Weight Determination in Controlled Environments," pp. 137–161, J. Wiley & Sons. Essentially a QCM used for micro weighing consists of a quartz plate having a mechanical resonance frequency that is inversely proportional to its thickness. Because of the very high Q (i.e. low internal friction) of quartz, the resonant frequency may be measured electrically through the piezoelectric effect. If a mass to be measured is applied to the resonator, e.g. in the form of a thin film, it will have an effect on frequency very nearly that of an increase in an equivalent mass of quartz. The added mass may be determined by translating frequency changes into an equivalent thickness of quartz and then into mass by means of the known density of quartz. However, the usefulness of quartz crystal microbalances is restricted to the mass determination of tightly adhering films, requiring an even distribution of the deposited sample mass and is severly limited in its capability to measure thick layers due to saturation effects. Also, the excitation of the quartz crystal causes the crystal surface which is used as the substrate for the deposited film to increase in temperature compared to the surrounding environment, with the result that for many applications it is necessary to apply cooling techniques and/or the use of matched pairs of crystals to compensate for thermal fluctuations. The introduction of cooling, however, produces temperature gradients which may change the mass distribution on the crystal and introduces significant errors in the mass determination due to non-uniform sensitivity to mass across the surface of the substrate. A further problem stems from the fact that QCM's are not suitable for applications where the adhesive forces of the deposited mass are not sufficiently strong to withstand the high surface accelerations. QCM's also are quite expensive and usually can only be used once.

The oscillating fiber microbalance is described by H. Patashnick and C. L. Hemenway, Review of Scientific Instruments, Vol. 40, No. 8, pp. 1008–1011, August 1969. Described briefly, this type of device comprises an electrostatically driven oscillating thin quartz or glass fiber of substantially constant cross-section which is clamped at one end and free at the other. As the frequency of the driving voltage is varied the fiber will display different resonant modes, with the frequencies at which the different resonances occur depending in part upon the physical parameters of the fiber. Mass determination is accomplished by adding mass to the free end of the fiber, which lowers the resonant frequency according to the amount of the mass, and then measuring the change in resonant frequency produced by the added mass. Each fiber has a characteristic force constant which affects its resonant frequency and variations in fiber lengths and diameters result in different sensitivities among different fibers. Hence each fiber has an optimum range for particle mass measurements. However, oscillating fiber microbalances heretofore available have been characterized by certain losses which limit their mechanical Q factor. More particularly, the mechanical Q factor has been limited mainly by so called "mounting losses" resulting from deformation of the mounting support for the fiber, and also by the elastic properties of the fiber. A higher Q factor is desirable since it enables a greater accuracy of the frequency and hence mass determination.

Accordingly, the primary object of this invention is to provide a microbalance which avoids or overcomes the limitations of quartz crystal and prior oscillating fiber microbalances and allows for the measurement of both thin film and particulate masses.

A further object is to provide a mass measuring device of high sensitivity coupled with structural simplicity.

Still another object is to provide a microbalance which has high sensitivity and accuracy, is easy to calibrate, can be made at relatively low cost, is reusable, can be used to measure a fixed mass or mass changes, does not require an even distribution of mass on the mass-supporting substrate, operates in the kilohertz region or lower, and comprises a sample holder which is thermally removed from any intrinsic heat generation.

These objects are achieved by providing a mass measuring device that comprises a specifically tapered oscillating elastic element, which may be a solid rod but preferably is a hollow tube or capillary, which is anchored at the wide end and free to oscillate at its other end. Means for driving the tapered element is provided. Due to the specifically designed taper it will preferentially oscillate in the fundamental resonant mode. The mass to be measured is either attached directly to the free end of the element or supported by a substrate at the free end. The element is tapered to minimize mounting losses and also to dissipate mechanical losses uniformly over the total length of the element.

This microbalance provides comparable accuracy and sensitivity compared to oscillating fiber microbalances and QCM's but avoids the disadvantages of both. The resonant frequency is typically in the kilohertz region or lower and the acceleration of deposited particles is several orders of magnitude smaller than the acceleration experienced in QCM's. Hence the adhesive forces needed to make particulate matter adhere to the fiber or substrate are comparatively small. Also, the substrate which acts as a sample holder is effectively thermally decoupled from the active elastic element where the heat generation occurs due to elastic deformations. Thus the mass to be measured is not affected by the heat produced. Other features and many of the attendant advantages of the invention are set forth in or rendered obvious by the following detailed description and the accompanying drawings, wherein:

FIGS. 2, 3 and 4 illustrate a microbalance system embodying the present invention;

FIG. 5 illustrates a modification of the invention; and

FIG. 6 is a typical calibration curve.

Identical numerals are used in the figures for identical parts or elements.

Figure 1:
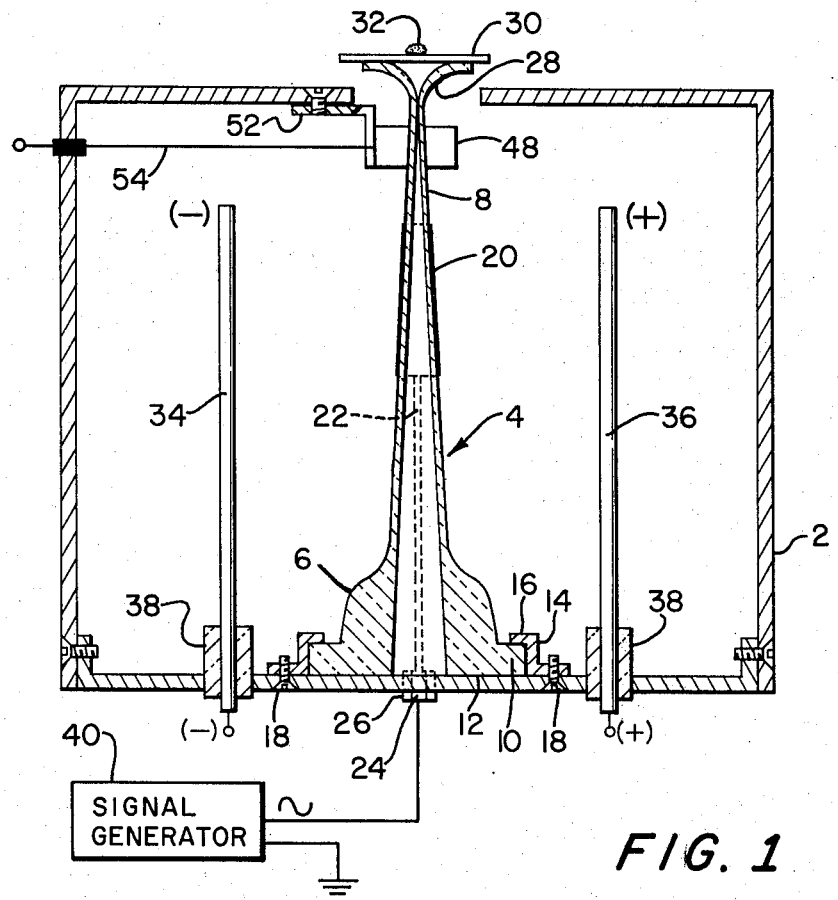
FIG. 1 is a sectional view in elevation of a preferred form of the microbalance device constructed in accordance with the present invention with means for stimulating the oscillation.

I have determined that the oscillating fiber microbalance can be improved upon by replacing its solid fiber of substantially uniform cross-section with an elastic element which is tapered in a special way so as to maintain a substantially constant radius of curvature over the active part of the element as it is dynamically flexed. The elastic element may be a solid rod but preferably it is hollow so that it constitutes a tube. Preferably the tube has a round, i.e. annular, cross-section and its active or oscillating portion has an internal diameter of capillary size — notably, in the order of 0.5 to 2.0 millimeters. One advantage of using a hollow tapered element rather than a solid tapered element is that it increases the Q factor of the microbalance. The explanation or reason for this increase in Q factor is believed to be as follows: If a solid rod is slightly bent one can identify a "neutral fiber" within the rod where the strain is substantially zero which contributes not at all or very little to the restoring force of the rod. The concept of the neutral fiber is disclosed by Joos, *Theoretical Physics*, Third Edition, page 177, Hafner Publishing Co. The restoring force, to a first approximation, increases with the square of the distance from the neutral fiber. Furthermore, elastic material close to the neutral fiber contributes to the mechanical losses while contributing little to the restoring forces. For these reasons, elimination of such ineffective portions of the rod will improve the mechanical Q. Another advantage of using a hollow tube is in the ability to compensate for frequency shifts due to temperature changes. These shifts are caused by a combination of length and diameter changes and a change in the elastic properties of the tube material. By adjusting the length, diameter and tube thickness, it is possible to reduce frequency shifts with temperature to a first order.

Several further advantages are achieved by replacing the solid fiber of substantially uniform cross-section with a solid rod or hollow tube which is tapered in a special way as hereinafter described. For one thing, the so-called "mounting" losses are minimized by the tapered construction. Secondly the tapered configuration assists in causing the dissipation of whatever mechanical losses occur to be uniformly distributed over the total length of the active element, whereby the extent of heat flow generated within the active element by the dissipated losses is substantially less than what is produced in a solid rod or fiber of nearly constant cross-section and of comparable size. Thirdly, the taper can be used as a fine adjustment for the compensation of the temperature effects mentioned above. Furthermore the appropriately fabricated taper acts as a suppressor for higher order vibrational modes which is of substantial interest for the stability and reliability of the device to obtain unambiguous results. In order to take advantage of a taper effectively, certain conditions must be approached which pertain to functional relations between the diameter (and also wall thickness in the case of a tube) of the active element as a function of the distance from the base, i.e. from the anchored end of the active element. The second moment can be defined in the form:

$$I = \iint y^2 dy dx$$

where $I$ is the second moment of a cross-section of the active element in a plane which is perpendicular to the longitudinal axis of the element, the product $dydx$ is a rectangular area element in that cross-section of the active element, and $y$ is the distance of that element from the neutral fiber. The integration is to be extended over the whole cross-sectional area of the active element. The neutral fiber represents those line elements in the above mentioned plane where the strain is zero under an elastic deformation characteristic for this device. A novel feature of the present invention is the utilization of a functional relation pertaining to $I$. In order to produce the fundamental resonant mode of vibration, the following relation should be observed: over the active length of the active element, the quantity $I$ should decrease uniformly with increasing distance from the base in such a way that $I$ disappears at an extrapolated effective distance $L'$ measured from the base where $L'$ is slightly greater than the real length $L$ of the active element measured from said base. Preferably, but not necessarily, the second moment $I$ decreases substantially linearly with increasing distance from the base.

I have also determined that the tapered construction of the active element aids in the suppression of high order vibrational modes to the extent that for a taper fabricated with $I$ varying as described above substantially only the fundamental resonance may be excited. However, through appropriate shaping of the active element and other actions, such as adjusting the manner or direction of exciting the active element, the appearance of another desired resonant mode can be accentuated. Hence, if for a selected application the appearance of a selected higher order vibrational mode may be used to advantage, the active element may be designed with another specific tapering function and/or excited so as to accentuate or promote the appearance of the desired resonant mode to the exclusion of all other modes. The tapered active element also can be excited along two orthogonal axes and thereby be made to undergo linear, elliptical or circular motion as it is being vibrated. However, for reason of simplicity, it is preferred to excite the active element along a single axis so that it vibrates linearly and in its fundamental mode. As stated before, the preferred configuration consists of a hollow tapered tube.

Several different arrangements may be used to excite, i.e. drive, the active element and to maintain it vibrating in a selected mode at a selected amplitude level. A preferred drive arrangement consists of coating a portion of a tapered rod or capillary tube made of an electrically non-conducting material, e.g., quartz, with a thin layer of a conductive material such as gold, applying an a.c. voltage to the conductive layer so as to produce an alternating charging effect, and providing a static electric field across the capillary which interacts with the electrical charge delivered to the tapered rod or tube so as to electrostatically excite the latter into oscillation. The same results can be achieved by modifying the electrostatic drive just described so that a constant electric charge is supplied to the conductive layer on the active element and an a.c. electric field is provided across the active element to interact with the constant electric charge. While an electrostatic drive is advantageous for maintaining a tapered tube in a selected oscillation mode since only a very small amount of power input per cycle is required due to the high mechanical quality factor or Q of the hollow tapered tube, a different excitation may be used to initiate oscillation. Thus, initial excitation may be achieved by supplying a voltage pulse to the system or by a mechanical excitation. Once the device is set into oscillation, the oscillations will proceed at the natural frequency of the vibrating system which depends on the elastic property of the tapered element and the mass deposited thereon. In order to maintain the resonant oscillations, a feedback system is used which senses the natural or resonant frequency of the vibrating element and supplies the drive system with an a.c. voltage of that frequency. The feedback system can be based upon optical, electrical, magnetic or other appropriate effects obvious to persons skilled in the art which permit the periodic variation of position of the tapered element to be sensed by the feedback system and translated into a periodic excitation.

Referring now to FIG. 1, there is shown a housing 2 in which is disposed a thin walled quartz tube designated generally by the numeral 4. The tube has a circular cross-section and essentially comprises two discrete sections, an end section 6 and a vibrating section 8. The vibrating section 8 is formed with a taper as specified above. The end section 6 has an enlarged wall thickness and the outer surface has a generally bell-shaped configuration. For convenience of illustration, the diameter of the vibrating section 8 is exaggerated with respect to its length. In practice, the average outer diameter of vibrating section 8 is preferably in the order of 100–1000 times as small as its length, and its length and average diameter will vary according to the mass to be evaluated. Thus, for mass determination in the range of $10^{-5}$ to $10^{-11}$ grams, the length of the vibrating section 8 typically may be in the range of 2–5 cm.

The end section 6 is formed with a peripheral flange 10 and a flat end surface 12. The flange 10 facilitates attachment of the tube 4 to the base of the housing 2 by means of an annular ring 14 which is made of an electrically insulating material and has a lip 16 which overlies the flange 10. Ring 14 is removably secured to the base of the housing by means of screws 18. The outer surface of the vibrating section 8 is coated over a portion of its length with a film or layer 20 of a conductive material such as gold. The film 20 may be deposited onto the tube by evaporation or other suitable techniques known to persons skilled in the art. In addition, an elongate conductor element 22 is affixed to the outer surface of the tube 20 in contact with the film 20. The element 22 functions as a connecting lead and may take the form of a film of a conductive metal such as gold which also may be applied by evaporation or other suitable techniques known to persons skilled in the art. The lead 22 extends around the flange 10 of the tube and engages a conductive terminal 24 which is mounted centrally of the tube in an insulating sleeve 26 affixed in a hole in the base of the housing 2. The underside of that portion of lead 22 which extends along the inner surface of the base of the housing is coated with an electrically insulating material (or else the confronting portion of the inner surface of the base of the housing is provided with an insulating coating) so as to prevent short circuiting of the lead 22.

The extremity of the vibrating section 8 of tube 4 is formed with a flared thin walled section as shown at 28 which serves as a holder for a mass-supporting substrate 30 which, for example, may be a sheet of aluminum foil or a thin glass plate. The substrate 30 is attached to the flared end 28 of the tube, e.g., by means of a cement, and the mass to be evaluated, shown at 32, is placed on and affixed to the substrate, e.g., by evaporation deposition.

Also mounted in the housing 2 are two field electrodes 34 and 36. These electrodes are preferably in the form of round rods, but they may have other cross-sectional shapes. Thus, for example, the electrodes 34 and 36 may have a square or rectangular configuration. These electrodes are anchored in insulating sleeves 38 which are affixed in holes in the base of the housing. The electrodes 34 and 36 protrude from the housing so that they may be connected to a source of d.c. potential. In the illustrated embodiment, electrode 34 is connected to a negative d.c. potential, while the other electrode is connected to a positive d.c. potential. An audio frequency signal generator 40 is coupled to terminal 24.

With the foregoing apparatus, a d.c. electric field is established between electrodes 34 and 36 and an a.c. voltage is applied to the conductive layer 20 via lead 22. As a consequence, the upper section 8 of tube 4 will oscillate transversely in accordance with the frequency of the voltage applied to it due to the interaction of the periodically varying charge on its conductive layer 20 with the d.c. electric field in the space between electrodes 34 and 36. Assuming that substrate 30 and mass 32 are omitted, if the frequency of the voltage applied by the signal generator is tuned through various frequency ranges, the tube will vibrate and display vibrating reed frequencies, with the frequencies at which the resonant modes occur depending in part upon the physical parameters of the tube. When mass is added to the free end of the tube, the resonant frequencies shift downward with the magnitude of the frequency change being dependent on the mass loaded.

Figure 3:
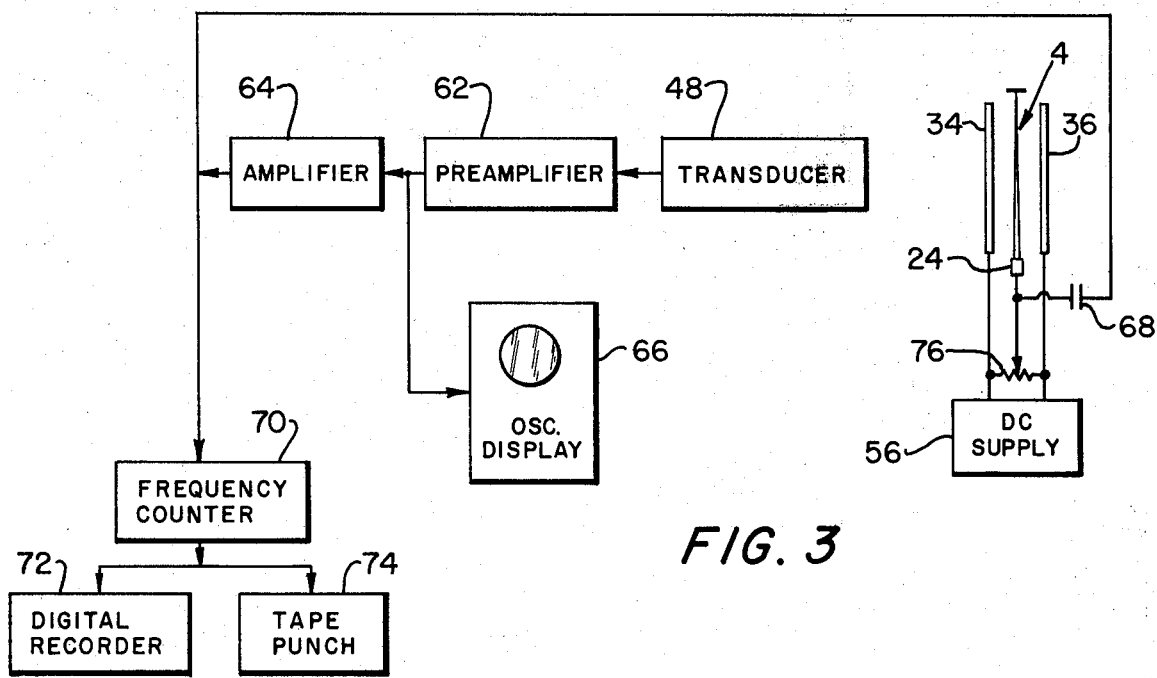

FIGS. 2–4 illustrate a microbalance system which incorporates the apparatus of FIG. 1 but replaces the signal generator 40 with instrumentation for tracking and sustaining tube oscillation. Essentially the instrumentation requires the use of (1) a motion detector for sensing tube oscillation and providing a signal that varies in accordance with tube position, i.e., that has a frequency in accordance with the oscillation, and (2) a feedback means for driving the hollow tube at the frequency of the signal output of the motion detector. The motion detector may take various forms as hereinafter noted in greater detail. Preferably, however, the motion detector is adapted to optically sense oscillating movement of the hollow tube and comprises an electrooptical transducer 48 positioned on one side of the hollow tube and a light source 50 positioned on the other side of the hollow tube and adapted to direct a beam of light at the transducer. The transducer and light source are mounted in orthogonal relation to the two field electrodes 34 and 36 so that the hollow tube will vibrate transversely of the light beam. The transducer 48 may be mounted to the housing 2 by various means, e.g. by a bracket 52 attached to a wall of the housing. Although not shown, it is to be understood that the light source 50 may also be attached to the housing by a bracket like that shown at 52. The output side of transducer 48 is connected to a suitable cable 54 which extends out through a wall of the housing and is connected to the feedback system. The light source 50 is coupled by a corresponding cable (not shown) to a suitable power supply such as the d.c. supply 56 shown in FIG. 3.

Referring now to FIG. 2, the transducer 48 preferably comprises an objective represented schematically as a lens 58 and a phototransistor circuit 60, with the objective being positioned and designed to project the image of the hollow tube 4 onto the photosensitive surface of the phototransistor and the latter being adapted to produce a voltage output which varies in accordance with the position of the shadow image of the hollow tube. Alernatively, the transducer 48 may employ a photodiode circuit rather than a phototransistor circuit to produce a signal in response to the position of the shadow image of the hollow tube. Specific details of the objective and phototransistor circuit are not provided herein since such devices are well known to persons skilled in the art and since still other forms of optical transducers may be used. Thus, the transducer 48 may have a photoresponsive circuit constructed similar to the photoduodiode preamplifier or the chopped light detector disclosed by J. Markus, Electronic Circuits Manual, pp. 574, 581, McGraw-Hill, 1971, or the detector disclosed on P. 65 of Electronic Circuit Designer's Casebook, published by McGraw-Hill.

Referring now to FIG. 3, the a.c. voltage signal output of transducer 48 is amplified by a preamplifier 62 and an amplifier 64 and fed back to the film 20 of the hollow tube via a coupling capacitor 68 and conductive terminal 24, whereby to excite the hollow tube. The output of preamplifier 62 is also applied to an oscilloscope 66. For the purposes of this invention one or the other of preamplifier 62 and amplifier 64 is of a type which is capable of being tunable to a selected frequency. The hollow tube is maintained in oscillation by appropriate gain settings in both amplifiers as the signal output of preamplifier 62 is viewed on the oscilloscope. The frequency of the signal output of amplifier 64 is monitored by applying it to a period averaging frequency counter 70 whose output may be printed out by a digital recorder 72 and punched out in paper tape by a suitable tape punch device 74. If as hereinafter described, the apparatus is arranged so that the hollow tube 4 extends horizontally, a high resistance potentiometer 76 is preferably used to apply a d.c. potential to the hollow tube so as to enable it to be centered between electrodes 34 and 36, the resistance element of the potentiometer being coupled across the output terminals of the d.c. supply 56 and its slider being connected to terminal 24.

Referring now to FIG. 4, the photosensitive surface of the phototransistor is masked so that the area thereof which is exposed to the hollow tube and the light source is preferably in the shape of an equilateral triangle 78 with one side 80 of the triangle extending parallel to the hollow tube in its at-rest position. The transducer 48 is positioned so that the projected shadow image of the hollow tube in its at-rest position extends halfway between the side 80 and the opposite apex of the triangle 78. Consequently if the hollow tube is oscillating, less light will impinge upon the photosensitive area of the transducer when the tube moves toward the side 80 and more light will be received when the tube moves away from the side 80 toward the opposite apex of the triangle. The voltage output of the phototransistor will increase or decrease as more or less light is received by the photosensitive area of the phototransistor.

It is to be noted that the mass may be loaded in a manner other than as shown in FIG. 1. Thus, for example, the upper end of the tube need not be flared as shown at 28 but instead the taper could extend to the top of the tube, with the tube terminating in a flat end surface and the mass to be determined attached directly to the end surface of the tube. Also, depending upon the nature of its composition, the mass to be determined could be applied as a thin film to the outer surface of the hollow tube, preferably as close as possible to its top end.

It is to be noted also that the hollow tube need not be mounted vertically but instead could be oriented horizontally or some other angle. In this connection it is to be noted that for a horizontal tube, it is possible, as shown in FIG. 5, to provide the free end of the tube with a cup-shaped extension 82 for holding the mass to be evaluated. Extension 82 may be an integral part of the tube or may be formed as a separate element and attached to the tube.

The tube preferably has a circular cross-section, but it may have a cross-section of other configuration, e.g. elliptical or rectangular.

The tube may be formed so that both its inner and outer surfaces are tapered as shown in FIG. 1. However, it also is possible to utilize a tube that is tapered on the outside but has a constant inner diameter.

A further possible modification is to fabricate the hollow tube of an electrically conductive material, thereby eliminating the need for applying the film 20 and the lead 22. The tube also may be made of glass, quartz or a ceramic material. Preferably, the tube is made of an essentially monocrystalline material such as monocrystalline alumina, i.e., sapphire. A monocrystalline material has lower mechanical losses and superior elastic properties than quartz, glass and the like.

As previously noted, the motion-detecting transducer need not operate on optical principles but could, for example, be in the form of a magnetic or electrostatic pickup. A suitable magnetic pickup would comprise a magnetic or permanently magnetized film deposited on the hollow tube and a pickup coil disposed so that a change in position of the tube causes an electromotive force to be induced in the coil (see H. N. Norton, Handbook of Transducers for Electronic Measuring Systems, pp. 16–21, Prentice-Hall, 1969, for magnetic, capacitive and other types of motion sensing transducers). Similarly, it is possible to excite, i.e., oscillate, the tube by a magnetic rather than an electrostatic drive. A further possible method of exciting the tube is to subject its bottom or enlarged end to pulses of air. In such case, however, the opening in the free end of the tube should be unblocked. Still other means of oscillating the tube will be obvious to persons skilled in the art.

Since microbalances constructed in accordance with this invention are capable of measuring the mass of film deposits as well as particulate matter, they are particularly suited for measuring any kind of mass changes. For this reason, a field of application is found in the monitoring of vacuum depositions. The device also can be used to measure deposition rates in gaseous environments and, as an example, the monitoring of atmospheric particles and surface contamination can be achieved. The device also can be used to measure the rate of sublimation or evaporation of a small mass.

Calibration can be achieved by attaching appropriate masses, such as nickel or aluminum microspheres or wire sections to the hollow tube and making a series of frequency determinations for the different masses. The mass of each microsphere is easily calculated since the density of the masses is known and their sizes can be easily determined under a microscope. Accordingly, a calibration curve wherein frequency is plotted against mass can be drawn for each tube. Thereafter mass determination can be readily effected by measuring the resonant frequency of the tube loaded with a specific mass, and ascertaining from the calibration curve the mass loading which will provide the observed resonant frequency of the loaded tube.

To demonstrate the present invention, a fundamental mode device was constructed from a cylindrical glass capillary having an inner diameter of 1.0 mm and an outer diameter of 1.6 mm. This capillary was drawn to a monotonically decreasing taper as specified above. Its outer diameter decreased from 1.6 mm adjacent its fixed end to 0.12 mm at its free end. The overall length of the tube was about 4 cm. An aluminum foil was attached to the free end of the tube as a convenient substrate. The tube was driven electrostatically and its oscillation sensed optically by means as shown in FIGS. 1–4. The tube was operated in a vacuum and a series of weights were attached to the substrate and the resonant frequency for each loading was measured. From the test results a calibration curve of mass versus resonant frequency was prepared and is shown in FIG. 6. From the calibration curve a dm/df of about $2\times10^{-4}$ g/Hz can be deduced at 25 Hz. Since the resonant frequency can be reliably determined to one part in $10^5$, a sensitivity of $5\times10^{-8}$g results. This sensitivity is comparable to QCM's, especially since there is no a priori limit to the area of the mass-supporting substrate carried by the tube. Utilization of a tube made of a material with a higher mechanical quality factor, such as quartz or sapphire, leads immediately to a measurable improvement in sensitivity.

What is claimed is:

1. A mass measuring device comprising an elongate elastic element which is tapered from a first larger end to a second smaller end and which is adapted to support a mass to be measured at its smaller end, said elastic element being tapered so that the second moment defined as $$I = \iint v^2 dy dx$$

varies in a predetermined manner according to the distance from said larger end, where $y$ is the distance from the neutral fiber of said elastic element, the product $dydx$ is a rectangular area element in a cross-section of the elastic element lying within a plane perpendicular to the axis of said elastic element, and the integration is extended over the whole area of said cross-section, means for anchoring said first larger end so that its second smaller end and the mass carried thereby are free to oscillate, drive means for dynamically flexing said elastic element so that its smaller end will oscillate at a resonant frequency, and means for measuring the resonant frequency of oscillation of said elastic element with and without said mass, whereby the magnitude of said mass can be determined by the change in resonant frequency due to the presence of said mass.

2. A device according to claim 1 wherein said element is a solid rod.

3. A device according to claim 1 wherein said element is made of a substantially monocrystalline material.

4. A device according to claim 1 wherein said sensing means optically senses the oscillating movement of said element.

5. A device according to claim 1 wherein said sensing means magnetically senses the oscillating movement of said element.

6. A device according to claim 1 wherein said second moment varies uniformly with the distance from said larger end and becomes zero at a point L', where L' is an extrapolated distance from said first end which exceeds the length L of said elastic element measured from said first end.

7. A device according to claim 1 further including an enlargement on said second smaller end of said element for supporting a sample mass to be measured.

8. A device according to claim 7 wherein said enlargement is flared and has an edge surface for supporting a sample holder.

9. A device according to claim 1 wherein said element has an electrically conductive means attached to its exterior intermediate its ends, and said drive means comprises a pair of electrodes spaced from said element and means for applying a varying electrical potential between said electrodes and said electrically conductive means.

10. A device according to claim 9 wherein said element is made of material which is not an electrical conductor.

11. A device according to claim 9 further including means for operating said drive means in response to the frequency detected by said sensing means.

12. A device according to claim 9 wherein said means for applying an electrical potential comprises a source of alternating potential connected to said conductive means and means for providing a d.c. potential between said two electrodes.

13. A device according to claim 1 wherein said element is a hollow tube.

14. A device according to claim 13 wherein the interior cross-sectional area of said tube decreases progressively from said first larger end to said second smaller end.

15. A device according to claim 13 including a supporting member, and further wherein said tube has an enlarged relatively thick wall section at its first larger end, and said anchoring means clamps said enlarged relatively thick wall section to said supporting member.

16. A device according to claim 13 wherein said tube is monocrystalline alumina.

17. A device according to claim 16 wherein said tube is made of quartz or glass.

18. A mass measuring device comprising an elongate elastic element having a first end which is adapted to support a mass to be measured and a second larger end which is anchored so that said first end and the mass carried thereby are free to oscillate, said element being tapered from said second end to said first end in a predetermined manner so that said element will have a substantially constant curvature when it is flexed dynamically relative to said second end, drive means for dynamically flexing said element so that its said first end will oscillate at a resonant frequency, and means for sensing the resonant frequency of oscillation of said element with and without said mass, whereby the magnitude of said mass can be determined by measuring the difference in the resonant frequency of said element with and without said mass.

19. A device according to claim 18 wherein said elongate elastic element is a hollow tube.

20. A device according to claim 18 wherein said elongate elastic element is a solid rod.

21. A device according to claim 18 wherein said elongate elastic element is made of a substantially monocrystalline material.

* * * * *